Jan. 20, 1970
C. KLEESATTEL
3,490,270
SUBSTANTIALLY NON-DESTRUCTIVE FATIGUE TESTING BY
LOCALIZED STRESSING AT ULTRASONIC FREQUENCIES
Filed July 19, 1967
3 Sheets-Sheet 1
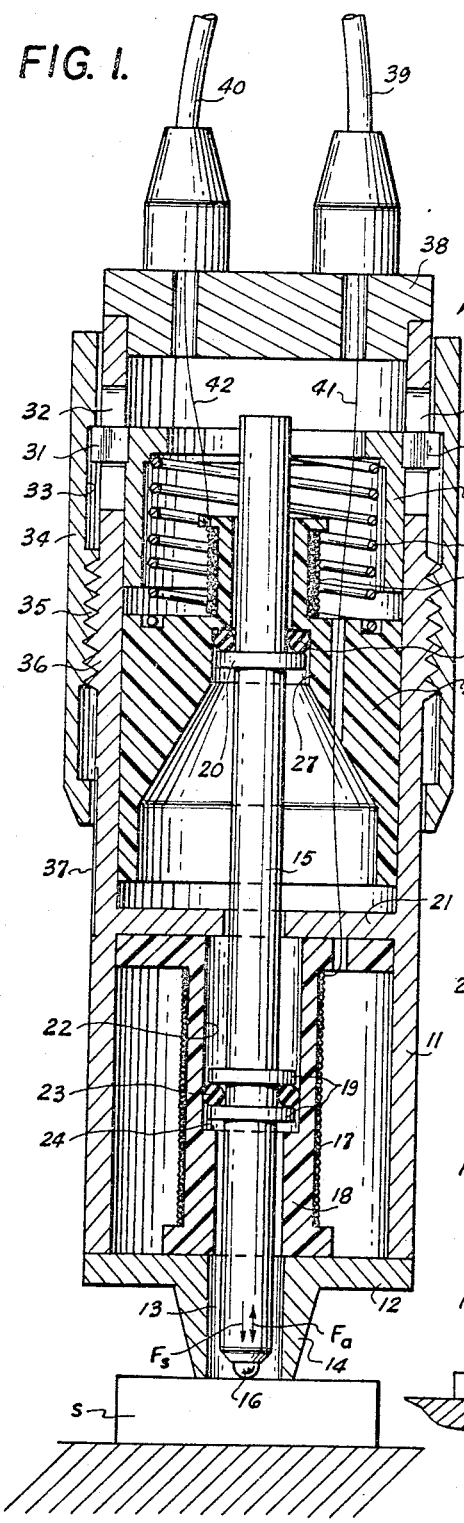
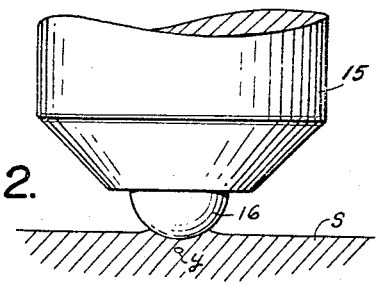
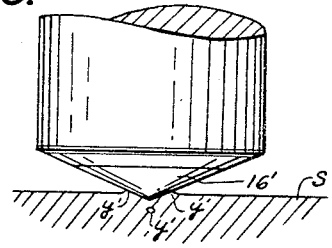
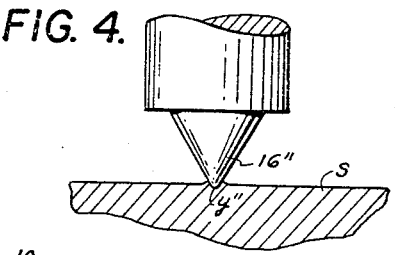
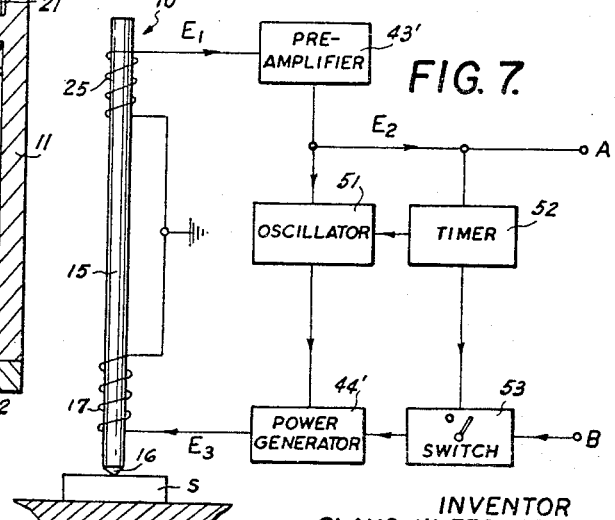
INVENTOR
CLAUS KLEESATTEL
BY
ATTORNEY

INVENTOR
CLAUS KLEESATTEL
BY
ATTORNEY

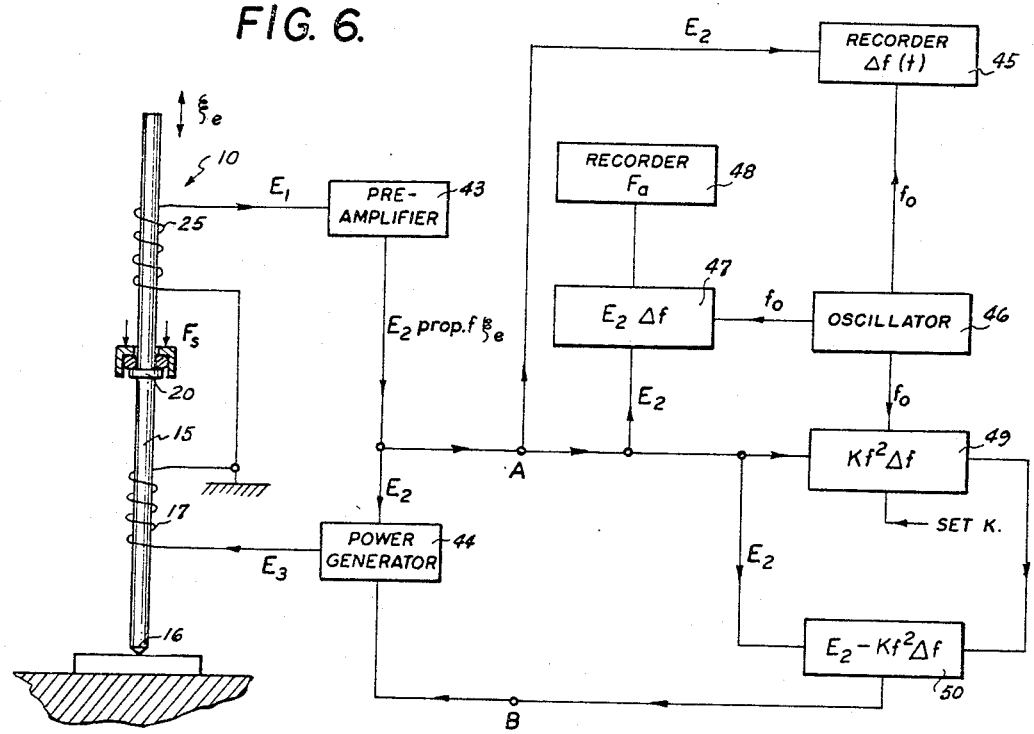
FIG. 6.
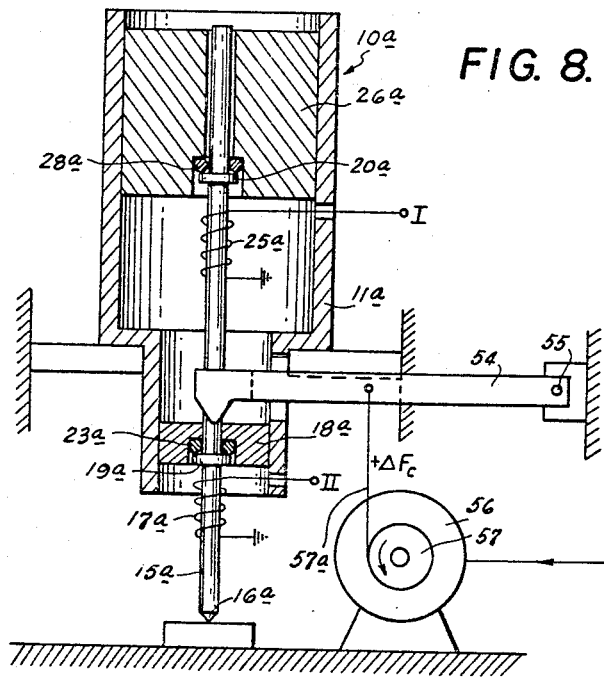
FIG. 8.
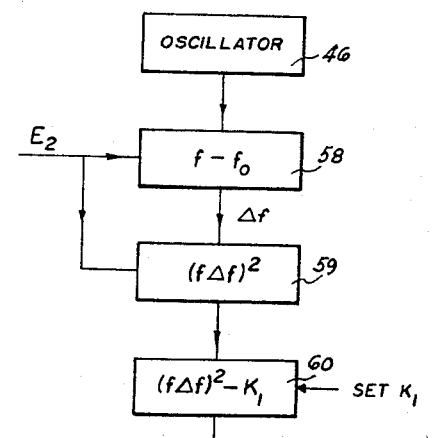
INVENTOR
CLAUS KLEESATTEL
ATTORNEY United States Patent Office 3,490,270
Patented Jan. 20, 1970

3,490,270
SUBSTANTIALLY NON-DESTRUCTIVE FATIGUE
TESTING BY LOCALIZED STRESSING AT
ULTRASONIC FREQUENCIES
Claus Kleesattel, 9841 64th Road,
Forest Hills, N.Y. 11374
Filed July 19, 1967, Ser. No. 654,488
Int. Cl. G01n 29/00
U.S. Cl. 73—67.3          19 Claims

ABSTRACT OF THE DISCLOSURE

A specimen has its surface initially indented by a contact tip on a mechanical resonating member, which tip is shaped to afford an area of contact with the specimen surface which increases with increasing penetration or indentation, whereupon, while the tip is held in steady contact with the indented specimen surface by a suitable static force, the mechanical resonating member is vibrated at a resonant frequency thereof which is preferably in the ultrasonic range to cyclically stress the specimen at or near its surface engaged by the tip until, by reason of fatigue, the stressed region of the specimen yields further under the applied static force to increase the indentation and hence the area of contact of the tip with the specimen, which causes shifting of the resonant frequency and thereby indicates the yielding by reason of fatigue without substantial destruction of the specimen.

This invention relates generally to fatigue testing.

It has been recognized, for example, as in "High Frequency Fatigue of Metals and Their Cavitation Damage Resistance," by A. Thiruvengadam, Transactions of the ASME, August 1966, p. 332, that a correlation exists between the usual low-frequency fatigue testing results and those obtained with high frequencies, such as frequencies of about 14 kc./s. However, all previous ultrasonic fatigue tests were performed only on resonant specimens. That is, an ultrasonic resonator was machined from the material under test and such resonator was secured to an ultrasonic transducer tuned to resonance, thereby to effect ultrasonic vibration of the specimen at its resonant frequency. Since the strained volume in a resonant specimen is substantial, a substantial amount of thermal energy is generated in the specimen. Adequate cooling of the specimen is either impossible or, at best, difficult to achieve so that an undesirable temperature rise occurs in the specimen at high ultrasonic strain rates. Further, the above described procedure, in requiring the machining of special resonant specimens, does not permit the ultrasonic fatigue testing of actual structural parts or assemblies. The existing procedure for ultrasonic fatigue testing is also disadvantageous in that it requires destruction of the specimen and in that the locations of the maximum stresses generated in the specimen when vibrated at ultrasonic frequencies cannot be predetermined at will, but rather depend on the geometry of the specimen.

Accordingly, it is an object of this invention to effect fatigue testing of a specimen without straining a substantial volume thereof, and hence without generating substantial thermal energy in the specimen so as to avoid the temperature rise problem heretofore encountered.

Another object is to make possible the fatigue testing of specimens constituted by actual parts or assemblies thereof rather than the testing of specially machined resonant specimens, and further to permit such testing of the parts or assemblies "in situ," that is, without removal from the machinery or structures in which they are normally situated.

Still another object is to make possible the substantially non-destructive fatigue testing of actual parts or assemblies so that, if desired, such parts or assemblies can be continued in use after the testing thereof.

A further object is to effect fatigue testing of a specimen with reference to the condition thereof at locations where fatigue damage is most likely to originate, for example, at the surface of the specimen or at a region a relatively small distance below such surface.

A further object is to make possible fatigue testing of actual parts or assemblies at relatively inaccessible areas where stresses are likely to be concentrated, for example, at fillets and the like.

In accordance with this invention, the specimen, which may be an actual part or assembly, has a surface thereof initially indented by a contact tip provided on a mechanical resonating member and shaped, for example, as a sphere, cone or pyramid, to afford an area of contact with the specimen surface which increases with increasing penetration or indentation of the surface by the tip, whereupon, while the tip is held in steady contact with the specimen surface at the indentation by a suitable static force, the mechanical resonating member is vibrated at a resonant frequency thereof which is preferably in the ultrasonic range to cyclically stress the specimen at or near its surface engaged by the contact tip until, by reason of fatigue, the stressed region of the specimen yields further under the applied static force to increase the indentation of the surface by the contact tip and thus increase the area of contact therebetween whereby the resonant frequency of the mechanical resonating member is varied. The resonant frequency of the mechanical resonating member may be monitored as a function of time to indicate the number of stress cycles required to produce further yielding by fatigue, as represented by a shift of the resonant frequency, whereby the specimen's resistance to fatigue damage or failure can be determined without substantial destruction of the specimen.

The above, and other objects, features and advantages of the invention, will be apparent in the following detailed described of illustrative embodiments thereof which is to be read in connection with the accompanying drawings, wherein:

FIG. 1 is a longitudinal sectional view of a probe that can be used in accordance with this invention for ultrasonic fatigue testing;

FIGS. 2, 3 and 4 are enlarged detail views of various shapes of contact tips or indenters that can be used with the probe of FIG. 1;

Figure 5A:
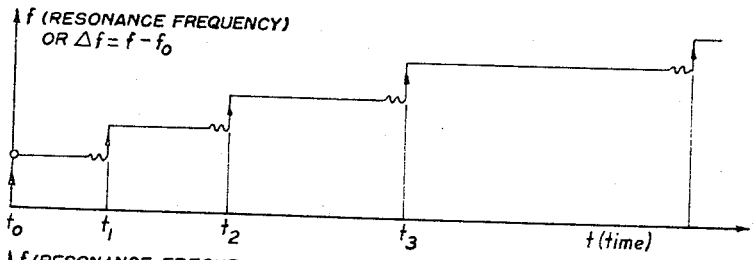

FIGS. 5A–F are graphic representations characteristic of various modes of ultrasonic fatigue testing in accordance with the invention;

FIG. 6 is a schematic diagram of a system for use in automatically practicing one mode of ultrasonic fatigue testing;

FIG. 7 is a schematic diagram showing a modification of a portion of the system of FIG. 6; and FIG. 8 is a schematic view showing a portion of a system for automatically practicing another mode of ultrasonic fatigue testing according to the invention.

Referring to FIG. 1 in detail, it will be seen that an apparatus for use in ultrasonic fatigue testing according to this invention comprises a probe 10 that may include a cylindrical housing 11, preferably of a ferromagnetic material, adapted to be hand-held and having a wall 12 at one end provided with a central opening 13 surrounded by an outwardly projecting neck or hollow boss 14.

A mechanical resonating member in the form of an elongated rod 15 extends axially in housing 11 and has a contact tip or indenter 16 at one end to extend through hollow boss 14 into contact with the surface of a part or specimen S to be tested. Electro-mechanical means are provided for effecting longitudinal vibration of rod 15 at a resonant frequency thereof. In the illustrated probe 10, such vibration of rod 15 is effected by forming the latter of a magnetostrictive material, for example, permanickel, nickel, permendur or other metals which have reasonably small band widths (high mechanical Q) so that the rod will vibrate when subjected to the influence of an alternating electromagnetic field established by supplying a suitable alternating current to an energizing coil 17 extending around the rod on a coil form 18.

The magnetostrictive rod 15 is dimensioned so that a loop of its longitudinal vibrational movement occurs at or near tip 16 when in the free condition, that is, when tip 16 is out of engagement with a specimen. This condition is approximately satisfied by providing rod 15 with a length that is a whole multiple of one-half the wavelength of the compressional waves generated in the material of the magnetostrictive rod in response to the supplying of the alternating current to energizing coil 17. For example, as shown, rod 15 may have a length equal to one wave-length, in which case it has two nodal points, and the rod may have flanges 19 and 20 located at or near such nodal points. The alternating current supplied to coil 17 may have a D.C. bias to polarize the rod, or alternatively the current supplied to coil 17 has a frequency equal to half the mechanical resonance frequency of rod 15.

The coil form 18 is located in housing 11 between end wall 12 and an intermediate wall 21, and the central bore 22 of the coil form is engaged by a rubber ring 23 which extends around rod 15 between flanges 19 to center the rod. The central bore 22 further has a step or shoulder 24 therein engageable by one of flanges 19 to limit the axial projection of rod 15 from housing 11 when tip 16 is not pressed against a specimen or test piece.

A pick-up coil 25 extends around rod 15 on a coil form 26 which is slidable in housing 11 at the side of wall 21 facing away from coil 19 so that the ferromagnetic wall 21 provides a magnetic shield between the energizing and pickup coils. If rod 15 is polarized, or a D.C. bias is applied to coil 25, an alternating voltage is induced in coil 25 by reason of the vibration of rod 15. Such induced alternating voltage has a frequency equal to that at which rod 15 is vibrated and a magnitude which is a function of the amplitude of vibration of the rod.

Coil form 26 has a recess 27 which receives flange 20 of rod 15, and a rubber ring 28 extends around rod 15 above flange 20 and engages the side wall surface of recess 27 to center rod 15 and the roof of recess 27 for transmitting a static force axially from slidable coil form 26 to rod 15. Such axially directed static force is exerted on coil form 26 by a helical compression spring 29 which engages, at one end, against coil form 26 and is engaged, at its other end, by a spring retainer 30. Retainer 30 is slidable in housing 11 above coil form 26 and has opposed ears 31 extending radially outward from retainer 30 through axial slots 32 in housing 11. The outer ends of ears 31 are engaged in an internal, circumferential groove 33 of an adjusting sleeve 34 extending around housing 11. Sleeve 34 has internal threads 35 engaging corresponding external threads 36 on housing 11 so that rotation of sleeve 34 relative to the housing causes axial displacement of sleeve 34 and retainer 30 relative to housing 11 for adjusting the compressive loading of spring 29 and thereby varying the static force for urging contact tip 16 against a specimen or test piece. A scale 37 may be provided on housing 11 to cooperate with an end edge of sleeve 34 for indicating that static force for which the sleeve is set.

The probe 10 shown on FIG. 1 is completed by a cap 38 closing the end of housing 11 remote from end wall 12 and having cables 39 and 40 connected thereto from which wire leads 41 and 42 respectively extend to energizing coil 17 and pick-up coil 25.

It will be apparent that, when contact tip or indenter 16 is not engaged with a specimen or test piece, spring 29 urges rod 15 axially to the position determined by engagement of the lower flange 19 with shoulder 24, in which position contact tip 16 projects out of hollow boss 14.

In using the probe 10 for ultrasonic fatigue testing of a specimen or test piece S, the housing 11, while being hand-held or otherwise supported, is manually pressed against a surface of the specimen so as to engage the end edge of hollow boss 14 with such surface, as shown on FIG. 1, whereby rod 15 is axially shifted against the force of spring 29. Thus, the static force $F_s$ with which contact tip 16 is urged against the surface of specimen S is determined by the weight of rod 15 and coil from 26 and by the compressive loading of spring 29, which may be adjusted as described above, and which is independent of the magnitude of the manually applied force holding boss 14 against the specimen.

The contact tip or indenter 16 may be spherical, as shown on FIGS. 1 and 2, pyramidal or conical, as at 16' on FIG. 3, or sphero-conical, as at 16" on FIG. 4, or of any other shape that will afford an area of contact with the specimen which increases with increasing penetration or indentation of the specimen surface by the contact tip. The shape of the contact tip or indenter and the depth of the indentation made thereby in the specimen surface determine the location of the stress maximum arising during the fatigue test to be described and hence the location at which fatigue damage occurs in the specimen. When the contact tip or indenter is spherical and has a relatively large diameter, the shear-stress maximum is located at a region y (FIG. 2) which is spaced below the indenter in the material of the specimen. In the case of a conical or pyramidal contact tip or indenter having a large apical angle, as in FIG. 3, the region y' of maximum shear stress is also spaced below the contact tip and there are also stress concentrations y' at the edge of the indentation. However, when the indenter 16" has a small diameter spherical tip or is conical or pyramidal with a small apical angle, the location of the region y" of maximum shear stress is at such tip (FIG. 4). Thus, the stress distribution in the specimen, the location of the shear-stress maximum, and the extent of the yielding zone can be controlled to some degree by suitable selection of the shape of the contact tip or indenter with which probe 10 is provided.

When contact tip or indenter 16 is pressed against a surface of specimen S by the static force $F_s$, the material of the specimen immediately under the contact tip yields, as shown on FIG. 2, until equilibrium is restored. Such yielding of the test piece or specimen under the contact tip, and hence the area of contact $S_c$ of the contact tip with the specimen when only the static force $F_s$ is applied, are functions of the hardness of the test piece or specimen.

After the above described initial indentation of the specimen by the contact tip under the static force $F_s$, probe 10 is energized to effect ultrasonic vibration of rod 15 thereby superposing an oscillating force, having a peak value $F_a$, on the static force. If non-linearities are ignored, the resulting total force as a function of time takes the following form:

$$F(t) = F_s + F_a \sin \omega t$$
$$= F_s \left(1 + \frac{F_a}{F_s} \sin \omega t\right) \quad (I)$$

in which $\omega = 2\pi f$ (that is, the circular frequency of the oscillating force).

At all times, the static force $F_s$ is selected to be greater than the dynamic force amplitude $F_a$ so that the contact tip or indenter is held in steady contact with the test piece or specimen. If the dynamic force $F_a$ is allowed to be greater than the simultaneously applied static force $F_s$, then intermittent contact occurs and it becomes almost impossible to determine the exact magnitude of the peak of the alternating force.

The static force applied simultaneously with the oscillating force can be maintained at the same level as the static force employed for effecting initial indentation of the specimen by the contact tip, in which case the fatigue test is conducted at the yield point with the stresses exceeding the yield stress. Alternatively, the static force applied simultaneously with the oscillating force may be less than the static force employed for the initial indentation, in which case the fatigue test is conducted below the yield point and the stresses may or may not exceed the yield stress.

Although the described probe 10 is arranged so that contact tip 16 of its rod 15 is vibrated in the direction of the axis of such rod, that is, normal to the surface of the specimen or test piece against which the contact tip is pressed so as to generate compressional waves in the test piece, it is to be noted that ultrasonic fatigue testing in accordance with this invention can also employ a probe having its contact tip or indenter vibrated parallel to the contacted surface of the specimen to generate a shear wave in the latter, or a probe having its contact tip angularly vibrated about an axis normal to the contacted surface of the specimen to generate a torsional wave in the specimen, in which case the contact tip is preferably of pyramidal configuration, or a probe having its contact tip angularly vibrated about an axis that coincides with the contacted surface of the specimen to generate a flexural wave in the latter, or a probe having any combination of the foregoing vibrational movements imparted to its contact tip.

For the purpose of simplicity, the following discussion will be limited to the condition where the excitation of the contact tip is normal to the contacted surface of the specimen to generate a compressional wave therein.

The surface compliance $q$ that is effective at the region of contact of the contact tip or indenter with the specimen or test piece, and which is the sum of the compliance $q_D$ of the contact tip or point and the compliance $q_x$ of the test piece surface, is expressed by the formula:

$$q = \frac{1 + aEs'}{C_1 E_s' \sqrt{S_c}} \quad (II)$$

in which $a$ and $C_1$ are constants that depend on the shape and material of the contact tip, $E_s' = E_s/(1-\nu_s^2)$, where $E_s$ is the elastic modulus of the test piece and $\nu_s$ is the Poisson ratio of the test piece, and $S_c$ is the area of contact of the tip with the test piece. The above Formula II is simply derived from Equation 5 appearing in my U.S. Patent No. 3,153,338.

The resonance equation for the rod 16 is derived from Equation 1 of the above identified patent by substituting therein the term for $q$ given in Formula II above, and results in:

$$\left(\frac{\omega L}{v}\right) \tan \left(\frac{\omega L}{v}\right) = \frac{L}{E_r S_r q} = \frac{C_2 E_s' \sqrt{S_c}}{1 + aE_s'} \quad (III)$$

in which $L$ = length of the rod
$v$ = longitudinal sound velocity in the rod
$\omega = 2\pi f$ = circular frequency
$E_r$ = elastic modulus of rod
$S_r$ = cross-sectional area of rod.

From Equation III it will be apparent that any variation in the area of contact $S_c$ of the contact tip or indenter with the test piece (or in the elastic modulus $E_s$ of the test piece) will be reflected in a detectable change in the resonance frequency of the rod.

The contact area $S_c$ at any moment during the fatigue testing is not only a function of the static force $F_s$ but also of the dynamic force $F_a$. In the case of a spherical contact tip, a theoretical function for the time dependence of the contact area reads:

$$S_c(t) = S_{c,o} \left(1 + \frac{F_a}{F_s} \sin \omega t\right)^{2/3} \quad (IV)$$

in which $S_{c,o}$ is the contact area when $F_a = 0$. Such Equation IV is simply derived from Equation 4 appearing in my U.S. Patent No. 3,153,338.

The mean pressure under the contact tip is:

$$-p(t) = \frac{F(t)}{S_c(t)} \quad (V)$$

and by substituting Equations I and IV for $F(t)$ and $S_c(t)$ there is obtained:

$$-p(t) = \frac{F_s}{S_{c,o}} \left(1 + \frac{F_a}{F_s} \sin \omega t\right)^{1/3}$$

If $F_a = F_s$, which is the limiting case for the necessary condition that the dynamic force should not exceed the static force so as to ensure steady contact, then the maximum pressure under the contact tip is:

$$P_{max} = -1.26 \frac{F_s}{S_{c,o}}$$

(the negative sign indicating compression).

If $F_a = \tfrac{1}{2} F_s$, then $p_{max} = -1.14 \frac{F_s}{S_{c,o}}$

In the case where the static force employed during the fatigue test is as large as the static force used for the initial indentation, the yield stress is certainly exceeded as soon as probe 10 is energized and the supply of alternating current to its energizing coil 17 is tuned for resonance. Thus, the fatigue test is conducted at and above the yield point from the beginning thereof. Obviously, this cannot be done at low vibration frequencies, for example, at 60 c.p.s. However, at the high vibration frequencies employed in connection with the present invention, for example, at approximately 30 kc./s. or more, the yielding mechanism is made to "freeze," while only the fatigue mechanism remains effective. Under these conditions, either spontaneous or gradual fatigue and subsequent yielding takes place until the contact area is increased to the point where the maximum pressure ($p_{max}$) under the contact tip again approaches the static yield pressure. In the case where $F_a = F_s$, such yielding would take place until the contact area had increased by 26%, that is, until $S_c = 1.26 S_{c,o}$.

If $F_a$ is equal, or almost equal to $F_s$, there is an initial yielding at the very beginning of the test, that is, immediately after the probe is energized to raise the vibration amplitude to the specified level, and such initial yielding is not related to fatigue and should not be confused with a fatigue reaction, but rather results from the fact that the mean value of the contact area in time is smaller than the initial contact area $S_{c,o}$ by reason of the non-linearity expressed by Equation IV. Thus, if $F_a$ is comparable in magnitude to $F_s$, $$\frac{\frac{1}{T}\int_0^T S_c(t)dt}{S_{c,o}} < 1$$

Referring now to FIG. 5A, there is representted a characteristic frequency-time diagram for the case where the coil 17 of probe 10 is energized by a circuit providing both automatic control of the frequency for maintaining resonance of the rod 15 and automatic control of the amplitude of vibration for maintaining constant the dynamic force $F_a$. Under the foregoing conditions of operation, particularly with test pieces or specimens of aluminum or steel, there are observed repeated "jumps" or increases in the resonance frequency at the times $t_1$, $t_2$, $t_3$ etc., with expanding time intervals between such jumps, that is, with $$(t_1-t_0)<(t_2-t_1)<(t_3-t_2)$$

and so forth.

It is also noted, as shown on FIG. 5A, that each jump in the resonance frequency of rod 15 is always preceded by a brief period of fluctuation or instability. Apparently, before each irreversible slippage or additional yielding of the material of the test piece under the contact tip, there is encountered a break-down of the elastic modulus, and possibly also a formation of micro-cracks, which microcracks are "healed" (in a ductile material) as soon as a new plastic flow occurs.

It is to be realized that each frequency jump in the diagram of FIG. 5A indicates fatigue damage giving rise to additional yielding and thereby resulting in an increase of the contact area $S_c$. The increase in the contact area $S_c$ increases the coupling of the rod 15 with the test piece or specimen and thereby accounts for the detected jump in the resonance frequency of the rod. When the dynamic force $F_a$ is maintained at a constant value, as assumed in FIG. 5A, each increase in the contact area $S_c$ reduces the dynamic pressure at the interface of the contact tip and specimen and thereby accounts for the progressively increasing time intervals between the successive frequency jumps.

From the time interval $(t_1-t_0)$, $(t_2-t_2)$, $(t_3-t_2)$ or the like, and the resonance frequency occurring during such time interval, the number of stress cycles required to produce the fatigue damage can be readily ascertained.

Further, the magnitude of the dynamic force $F_a$ depends on the resonance frequency $f$ of the rod, the displacement amplitude $\xi_e$ at the free end of rod 15 and the parameters of the rod itself in accordance with the equation:

$$F_a = (svS)_{rod}\omega\xi_e \sin\frac{\omega L}{v} \quad (VI)$$

in which $s$, $v$, $S$ and $L$ are the density, longitudinal sound velocity, cross-sectional area and length, respectively, of the rod, and $\omega = 2\pi f$.

If $\sin \omega L/v_{rod}$ is less than 0.1, Equation VI can be simplified to $$F_a \approx 4\pi^2 m_{rod}\, \xi_e f(f-f_0) = C_3 E_p \Delta f \quad (VII)$$

in which:

$m_{rod}$ is the mass of rod 15
$f_0$ is the resonance frequency of the rod when its tip 16 is out of contact with a test piece.
$\Delta f$ is the frequency shift observed when the contact tip is brought into contact with the test piece and tuning is effected to achieve the new resonance frequency $f$.
$E_p$ is the voltage generated in pick-up coil 25 and filtered so that it becomes proportional to the vibration velocity $2\pi f\xi_e$.
$C_3$ is a constant.

Thus, the dynamic force $F_a$ is directly proportional to the product of the measured voltage $E_p$ and frequency shift $\Delta f$, and can be readily determined therefrom.

Since, as mentioned above, each jump of the resonance frequency indicates an increase of the contact area $S_c$, which increase is in the range between 2.5% and 5.0% when using a Vickers indenter as a contact tip, an evaluation of the fatigue test requires consideration of the contact area during each interval $(t_1-t_0)$, $(t_2-t_2)$ or $(t_3-t_2)$ as well as consideration of the static force $F_s$, the dynamic force $F_a$, and the number of stress cycles.

By applying Equation III above, the contact area $S_c$ as a function of frequency is $$S_c = C_4\left[\frac{\omega L}{v}\tan\frac{\omega L}{v}\right]^2 \quad (VIII)$$

in which $$C_4 = \left(\frac{1+aE_s'}{C_2 E_s'}\right)^2$$

If it is again assumed that the frequency shift $\Delta f = f - f_0$ is moderate, so that $$\tan\frac{\omega L}{v} \leq 0.1$$

then Equation VIII reduces to $$S_c \approx C_5(f\Delta f_7)^2 \quad (IX)$$

in which $C_5$ is a suitable constant.

Thus, the dynamic force $F_a$ and the contact area $S_c$ can be determined, and the static force $F_s$ can be determined from the compressive loading of spring 29 and the weight of rod 15 and coil form 26 if the probe is not applied horizontally.

The fatigue test can be conducted in various ways so far as the forces $F_a$ and $F_s$ are concerned. Thus, for instance, $F_a$ can be maintained constant while $F_s$ is also maintained constant, as in FIG. 5A; or the ratio $F_a/S_c$ can be maintained constant while $F_s$ is maintained constant; or $F_a$ can be maintained constant while the ratio $F_s/S_c$ is maintained constant; or the ratio $$\frac{F_a+F_s}{S_c}$$

can be maintained constant while the ratio $F_a/F_s$ is maintained constant.

By way of example, FIG. 6 schematically represents an arrangement for effecting ultrasonic fatigue testing under the conditions where the static force $F_s$ is maintained constant and the dynamic force $F_a$ is increased in proportion to increases in the contact area $S_c$ so as to maintain a constant $F_a/S_c$ ratio. It will be apparent from Equations VII and IX that the ratio $F_a/S_c$ may be written as:

$$\frac{F_a}{S_c} \approx \frac{E_p}{f^2\Delta f}C_5 \quad (X)$$

Thus, the condition that $F_a/S_c$ shall remain a constant requires that $$\frac{E_p}{f^2\Delta f} = K \text{ (a constant)} \quad (XI)$$

in which $E_p$ is proportional to $\xi_e f$. Obviously, the automatic handling of the condition of Equation XI requires computer circuitry which is only schematically represented on FIG. 6.

Since the signal $E_1$ generated by pick-up coil 25 generally will not be proportional to $\xi_e f$, but rather will be some odd function of these two quantities, such signal $E_1$ is fed to a preamplifier 43 containing the necessary filter elements (not shown) so that its output or feedback $E_2$ is proportional to the product $\xi_e f$. The connections between coils 17 and 25 and preamplifier 43 and a power amplifier or generator 44 are such that the system is undamped and vibrates at a frequency that is very nearly one of the resonance frequencies of rod 15 in the presence of the boundary conditions given by the contact of tip 16 with the test piece or specimen. When the rod 15 is as shown on FIG. 1, the full wavelength resonance frequency is imparted to the rod. However, the half-wavelength resonance may also be employed, as suggested on FIG. 6.

The alternating voltage $E_2$ proportional to $\xi_e f$ is fed to a recording device 45. An adjustable oscillator 46 is provided and adjusted so that its output is at the frequency $f_0$, that is, the free resonance frequency of rod 15. The frequency $f_0$ is fed to recording device 45 as well as the frequency $f$ of voltage $E_2$ so that device 45 actually records $f-f_0$, that is, $\Delta f$, as a function of time $t$. A multiplying circuit 47 multiplies the voltage $E_2$ by the frequency shift $\Delta f$, and the result of this multiplication is the dynamic force $F_a$ (see Equation VII) which is indicated or recorded, as by the recording device 48.

A circuit indicated at 49, squares the frequency $f$ of voltage $E_2$ and multiplies the result by the frequency shift $\Delta f$ and also by a selected constant K which is proportional to the dynamic pressure ratio $F_a/S_c$ (see Equations X and XI). Finally, a comparator or electronic bridge 50 receives $E_2$ and also $Kf^2\Delta f$ from circuit 49 and its output controls the gain of power amplifier or generator 44 and thereby controls the vibration amplitude so that the difference $E_2 - Kf^2\Delta f$ approaches zero at all times, and thereby maintains the desired constant value of the ratio $F_a/S_c$.

The record produced by recording device 45 of the system illustrated on FIG. 6 may be similar to that shown on FIG. 5A, with the exception that the intervals $(t_1-t_0)$, $(t_1-t_2)$, $(t_3-t_2)$ etc. between successive jumps in the resonance frequency of rod 15 will have relatively smaller differences by reason of the ratio $F_a/S_c$ being maintained constant, and the differences that exist will result only from the fact that the static force $F_s$ is constant while $S_c$ increases.

Figure 5B:
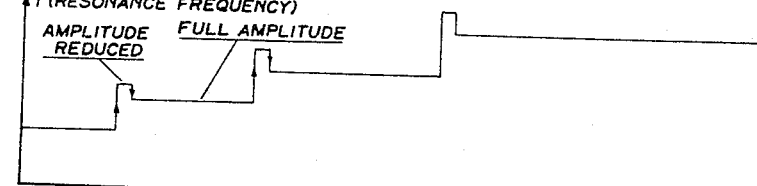

FIG. 5B represents a characteristic diagram of resonance frequency as a function of time in the case where the vibration amplitude is temporarily reduced immediately after each jump of resonance frequency, thereby to temporarily eliminate the non-linearity introduced by relatively high vibration amplitudes and to permit the frequency readings at such temporarily low amplitude level to give more accurate indications of the contact area $S_c$. Such temporary reduction of the amplitude of vibration can be obtained merely by switching the power amplifier, for example, as indicated at 44 on FIG. 6, to a low power level after each frequency jump and then restoring the original power level and hence the full vibration amplitude for the remainder of the interval until the next frequency jump.

Figure 5C:
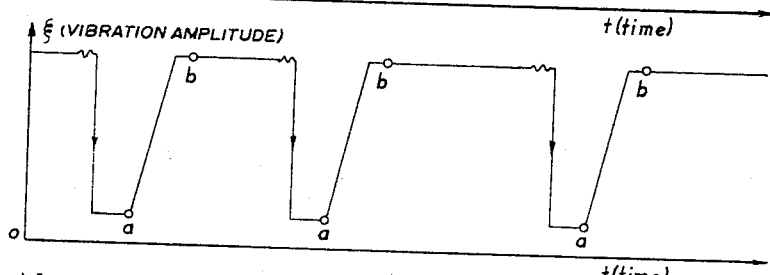
Figure 5D:
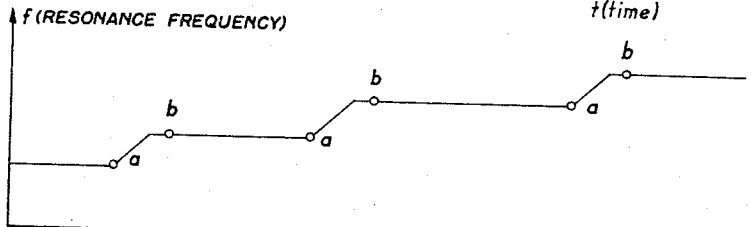

Referring now to FIGS. 5C and 5D, there are respectively shown diagrammatic representations of the vibration amplitude $\xi$ and resonance frequency $f$ as functions of time in the case where the frequency is tuned manually to restore resonance of the rod after each increase of the contact area $S_c$, or where automatic frequency control effects retuning only after each increase of the contact area and, after each retuning, the frequency is held constant until a new collapse of the vibration amplitude occurs as a result of the next increase of the contact area. In FIGS. 5C and 5D, the periods during which retuning of the frequency is effected run from each point $a$ to the following point $b$, and the periods during which the frequency is held constant run from each point $b$ to the following point $a$.

Substantially the mode of operation described above with reference to FIGS. 5C and 5D can be automatically effected by a system which is partially shown on FIG. 7 and is completed by those components of the system shown on FIG. 6 to the right of points A and B. In the system of FIG. 7, there are provided, in addition to the preamplifier 43′ and the power amplifier or generator 44′ corresponding to the similarly numbered components of FIG. 6, an adjustable oscillator 51, an electronic timer 52 and an electronic switch 53. The timer 52 is amplitude-sensitive and is triggered or rendered operative when the amplitude represented by the voltage $E_2$ from preamplifier 43′ falls below a preset level in response to an increase in the contact area of the tip or indenter with the test piece. When timer 52 is thus triggered or rendered operative in response to an amplitude collapse, it disconnects oscillator 51 from power generator 44′, closes the feedback loop from preamplifier 43′ to power generator or amplifier 44′, and closes switch 53 so that circuit 49 and comparator 50 (FIG. 6) become effective to control the amplitude during the retuning to the higher resonance frequency. When the full amplitude is restored, as at point $b$ on FIG. 5C, timer 52 opens switch 53, interrupts the feedback loop and connects oscillator 51 to power generator 44′. Oscillator 51 contains a memory device, that is, it adjusts itself to the frequency to which power generator 44′ is raised during the period when the feedback loop is closed, so that, when the feedback loop is opened or interrupted by timer 52 and oscillator 51 is again connected to power generator 44′, oscillator 51 operates to maintain the frequency of generator 44′ at the new level, until the next amplitude collapse occurs.

In FIGS. 5C and 5D, there are shown progressively increased intervals between the successive amplitude collapses, as would be the case where the dynamic force $F_a$ is maintained constant while the contact area $S_c$ is increased to cause each amplitude collapse shown on FIG. 5C of course, when a system is employed, as on FIG. 7, to maintain a constant value for the ratio $F_a/S_c$, then there will be a reduced difference between the intervals between the successive amplitude collapses and further the vibrational amplitude after each collapse will be increased as compared with the amplitude before the collapse.

Figure 5E:
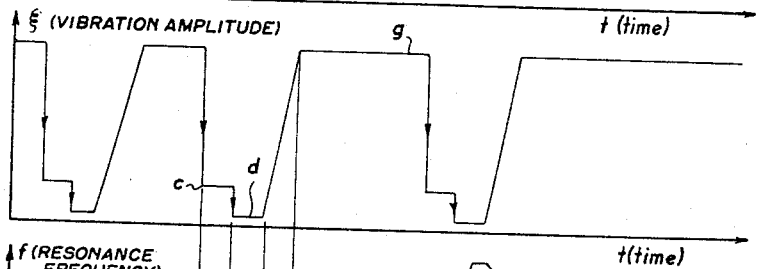
Figure 5F:
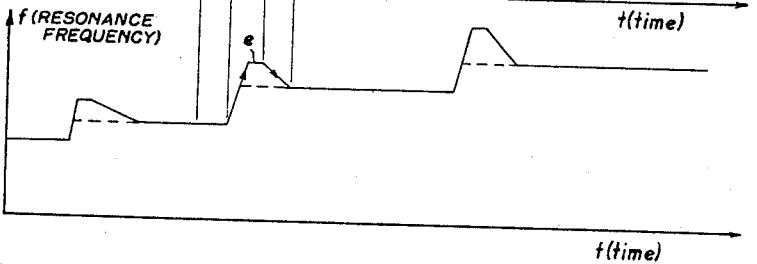

FIGS. 5E and 5F are diagrammatic representations of the vibration amplitude $\xi$ and resonance frequency $f$, respectively, as functions of time $t$ for a fatigue testing procedure similar to that described above with reference to FIGS. 5C and 5D, but in which, after each amplitude collapse indicated at $c$, the power level of the generator energizing coil 17 is reduced, as at $d$ (FIG. 5E), and retuning is first effected, as at $e$ (FIG. 5F), while the power level and hence the amplitude is reduced to permit recording of the corresponding resonance frequency before full power and amplitude are restored, as at $g$ (FIG. 5E). The procedure represented by FIGS. 5E and 5F has the advantage of permitting the frequency readings or recordings at the temporarily low power and amplitude levels to give more accurate indications of the contact area $S_c$ as described with reference to FIG. 5B.

The system shown on FIG. 6 can, with modification, be used to conduct the matigue test under conditions of constant static force $F_s$ and constant dynamic force $F_a$ merely by eliminating the components 49 and 50 and using the output of multiplying circuit 47 to control the gain or power level of power generator 44 so as to maintain a constant dynamic force $F_a$.

Further, if it is desired to operate with the ratio $F_a/S_c$ maintained constant and also with the ratio $F_s/S_c$ maintained constant, so as to obtain substantially equal time intervals between the successive frequency jumps resulting from increases of the contact area $S_c$, then the system of FIG 6 is used to maintain a constant value of $F_a/S_c$, as described above, and, in addition thereto, the system of FIG. 8 is employed for maintaining a constant value of the ratio $F_s/S_c$.

In the system of FIG. 8, the schematically illustrated probe 10a has its several parts identified by the same reference numerals as the corresponding parts of the previously described probe 10, but with the letter $a$ appended thereto. In the probe 10a, the static force $F_s$ for urging its contact tip 16a against the test piece or specimen consists of a constant component provided by a weight 26a bearing through ring 28a on flange 20a of rod 15a, and of a variable component applied to the rod through a member 18a, ring 23a and flange 19a by a lever 54 which is pivoted at 55. The force applied to rod 15a by lever 54 is determined by a torque motor 56 having a pulley or drum 57 on its shaft connected through a flexible cable 57a to lever 54. Thus, the total static force applied to rod 15a depends upon the torque produced by motor 56, and the torque of motor 56 is to be controlled to maintain constant the ratio $F_s/S_c$.

As indicated in Equation IX above, the contact area may be approximately written as:

$$S_c \approx C_5(f\Delta f)^2$$

in which $\Delta f = f - f_0$

Thus, in order to maintain constant the ratio $F_s/S_c$, the torque of motor 56 should be increased in accordance with increases in the difference between $C_5(f\Delta f)^2$ and $K_1$, where $K_1$ is logically a constant equal to $(f_1\Delta_1 f)^2$ in which the subscript 1 refers to the resonance frequency of rod 15a when the contact tip 16a thereof is initially contacted with the test piece under an initial or starting static force of $F_{s1}$. In the system of FIG. 8, the foregoing control is achieved by feeding the alternating voltage signal $E_2$ from preamplifier 43 of FIG. 6 to a comparator 58 which compares the frequency $f$ of signal $E_2$ with the resonance frequency $f_0$ in the free condition derived from oscillator 46 to provide a $\Delta f$ signal. Such $\Delta f$ signal is fed, along with $E_2$, to a circuit 59 which squares the product of $f$ and $\Delta f$, and the resulting $(f\Delta f)^2$ signal is fed into a comparator 60 where it is compared with the suitably set constant $K_1$ and, as the difference therebetween increases by reason of increases in the contact area $S_c$, a corresponding control signal is fed to motor 56 to increase the torque thereof and thus increase the static force $F_s$ for maintaining the ratio $F_s/S_c$ at a constant value.

When the static force is not increased to maintain a constant $F_s/S_c$ ratio, and bearing in mind that $F_a$ (the dynamic force) cannot exceed $F_s$ if the desired steady contact is to be maintained, then eventually the contact area $S_c$ will be increased to the point where $$p_{max} \leqq p_{yield}$$

and the time that elapses until a new break-down or yielding takes place becomes very much longer. If the frequency is of the order of 30 kc./s., the interval between successive breakdowns or yielding of the material may go from seconds to minutes. Materials, such as steel, which have a definite fatigue limit reach a point where no further yielding will occur. However, other materials, such as aluminum, will yield again and again if the dynamic test is conducted for a sufficient period of time.

In the foregoing description it has been mentioned that the dynamic test may be conducted with a static force that is either equal to or less than the static force used to make the initial indentations. If the static force used for the dynamic test is less than the initial static force, but nevertheless larger than the dynamic force $F_a$, then the fatigue test is conducted below the yield point of the material constituting the test piece so that a slower response is obtained. That is, longer periods or intervals occur between the jumps in resonance frequency which indicate the occurrence of fatigue damage.

It is to be noted that fatigue tests in accordance with this invention can be performed with relatively low static forces, such as 200 grams, assuming adequate surface finish on the test piece, to make indentations of about 100 microns and cause fatigue damage to a depth of no more than 100 microns. Such dimensions of the indentations and depth of fatigue damage are microscopic and the affected material can be completely removed from the test piece so that the fatigue test is non-destructive and can be applied to parts or assemblies which are to remain in use.

Since fatigue damage almost invariably originates in the surface of a structural part, the fatigue test according to this invention is applied to the most logical location. Of course, if it is desired to induce fatigue damage at a relatively greater depth below the surface of the test piece, for example, at a depth 0.5 mm. to 1.0 mm. below the surface, then it is necessary to start with a correspondingly larger indentation. Such large indentation and the fatigue damage at the indicated relatively large depth may not be easily removable from the test piece and, in that case, it may be necessary to sacrifice the tested part or assembly for the purpose of the fatigue test.

Fatigue tests according to the invention, particularly when conducted with the hand-held probe 10, can be conducted on actual parts or assemblies in situ, that is, in their location of actual use, or in areas of parts of difficult access, such as, the working surfaces of gear teeth. Further, if a part or assembly is subjected to fatigue testing as described herein prior to its extended use, and then subjected to the same test after such use, accumulated fatigue damage resulting from the stresses encountered in use may be detected.

The power required for fatigue testing according to this invention is relatively small. For example, with a static force of 200 grams, a mechanical power of 1 watt is sufficient for vibrations in the 30 kc./s. range. If the vibrational frequency is in the 300 kc./s., a mechanical power of about 10 watts is sufficient. At the foregoing powers, no heating problem is presented by reason of a temperature rise in the test piece, as the main losses arise at the area of contact itself and not within the test piece.

When the vibration frequency employed for fatigue testing in accordance with this invention is about 300 kc./s., a frequency made possible by the fact that the test piece as a whole is not vibrated, the testing speed is ten times the maximum speed possible with previously proposed ultrasonic fatigue tests on resonant specimens, and five thousand times the testing speed with conventional fatigue testing. The foregoing results from the fact that, when ultrasonic fatigue testing in accordance with this invention is conducted at a frequency of 300 kc./s., there are 18,000,000 stress cycles in one minute of operation, whereas, in conventional fatigue testing with a vibrator driven at a speed of 60 c./s., there are only 3600 stress cycles in the same period.

Although complete stress reversal is not achieved when the contact top or indenter is vibrated in the direction normal to the contacted surface of the test piece, the results obtained by such fatigue testing can be correlated with the results obtained from conventional fatigue tests. Further, complete stress reversal can be obtained if the contact tip is vibrated parallel to the contacted surface or vibrated angularly about an axis normal to the contacted surface so as to generate a shear wave or a torsional wave, respectively, in the test piece.

In the foregoing, fatigue testing in accordance with this invention has been described as being preferably conducted at frequencies in the ultrasonic range so as to minimize the time required for testing and the bulk of the equipment required therefor, and further to permit the static force applied during the fatigue test to be the same as that employed for the initial indenting so that the fatigue test is conducted above the static yield point. However, with the possible sacrifice of those specific advantages of the use of ultrasonic frequencies, frequencies below the ultrasonic range, and even as low as 60 c./s. can be used. Even when using such low frequencies, the test piece undergoing the fatigue test has only a small proportion of its volume subjected to the cyclical stressing, and such test piece may be an actual part or assembly tested in situ.

Having described illustrative embodiments of the invention with reference to the accompanying drawings, it is to be understood that the invention is not limited to those precise embodiments, and that various changes and modifications may be effected therein by one skilled in the art without departing from the scope or spirit of the invention, as defined in the appended claims.

What is claimed is:

1. A method of fatigue testing a test piece comprising urging a contact tip of a mechanical resonating member against a surface of the test piece so as to indent said surface, said tip being shaped to provide an area of contact with said surface which increases with the indentation of said surface by said tip, holding said tip in steady contact with the indented surface of said test piece by means of an applied static force while vibrating said mechanical resonating member at a resonant frequency thereof to cyclically stress the test piece at a region adjacent the contacted surface thereof at least until, by reason of fatigue, the stressed region yields under said static force to increase the indentation of said surface by said tip and hence shift said resonant frequency, and detecting said shift of resonant frequency as a function of time as an indication of fatigue damage to the test piece.

2. A method of fatigue testing according to claim 1; in which the vibrating of said mechnical resonating member is continued beyond a first shift of the resonant frequency thereof to obtain a plurality of shifts of said resonant frequency at spaced intervals.

3. A method of fatigue testing according to claim 1; in which vibrating of the mechanical resonating member is conducted at ultrasonic frequencies.

4. A method of fatigue testing according to claim 1; in which, during the vibrating of said mechanical resonating member, said contact tip is held against said indented surface with a static force greater than the maximum dynamic force resulting from the vibration.

5. A method of fatigue testing according to claim 4; in which said static force with which said tip is held against said indented surface during the vibration of said mechanical resonating member is at least as large as a force with which said tip is initially urged against said surface to indent the latter so that the fatigue test is conducted with said region of the test piece stressed above the static yield point.

6. A method of fatigue testing according to claim 4; in which said static force with which said tip is held against the indented surface during vibration of said mechanical resonating member is smaller than the force with which said tip is initially urged against said surface to indent the latter so that the fatigue test is conducted with said region of the test piece stressed below the static yield point.

7. A method of fatigue testing accordance to claim 1; in which the vibrating of said mechanical resonating member is continued to obtain a plurality of shifts of said resonant frequency at spaced intervals, and the amplitude of vibration of said mechanical resonating member is changed upon each increase of indentation of said surface by said tip to maintain a constant ratio of the peak dynamic force resulting from said vibration to the area of contact between said tip and said surface.

8. A method of fatigue testing according to claim 1; in which the vibrating of said mechanical resonating member is continued to obtain a plurality of shifts of said resonant frequency at spaced intervals, and, upon each shift of said resonant frequency, the static force with which said tip is held in steady contact with the indented surface is progressively increased to maintain a constant ratio of said static force to the area of contact of said tip with said indented surface.

9. A method of fatigue testing according to claim 1; in which the mechanical resonating member is ultrasonically vibrated in the direction to effect compressive stressing of said region of the test piece.

10. A method of fatigue testing according to claim 1; in which said mechanical resonating member is ultrasonically vibrated in the direction to effect shear stressing of said region of the test piece.

11. A method of fatigue testing according to claim 1; in which said mechanical resonating member is ultrasonically vibrated in the direction to effect torsional stressing of said region of the test piece.

12. A method of fatigue testing according to claim 1; in which said mechanical resonating member is ultrasonically vibrated in the direction to effect flexural stressing of said region of the test piece.

13. A method of fatigue testing according to claim 1; in which the magnitude of vibration of the resonating member is temporarily reduced upon said increase of indentation of the test piece by the contact tip, and the resonant frequency of said resonating member is measured during the vibration thereof at the temporarily reduced magnitude.

14. An apparatus for the ultrasonic fatigue testing of a test piece comprising a mechanical resonating member having a contact tip for indenting a surface of the test piece, said tip being shaped to have an area of contact with the indented surface which increases with the indentation of the surface by said tip, means to apply a static force for causing said tip to indent said surface of the test piece, means operative to vibrate said mechanical resonating member at a resonant frequency thereof while said tip is held in steady contact with the indented surface by said static force so as to cyclically stress the test piece at a region thereof adjacent its indented surface, and means to detect as a function of time each shift in the resonant frequency of said mechanical resonating member when the stressed region yields under said static force, by reason of fatigue, and thereby increases the indentation of the test piece surface by said tip.

15. An apparatus according to claim 14; in which said means to detect a shift in the resonant frequency includes pick-up means operable by vibrations of said resonating member to generate an alternating signal at the frequency of said vibrations and with a magnitude proportional to the product of said frequency and the amplitude of said vibrations, means operative to record the frequency of said signal as a function of time, thereby to indicate each said shift of frequency and intervals between successive frequency shifts; and further comprising multiplier means operative to multiply said signal by the difference between said resonant frequency of vibration of the resonating member, when said tip thereof is in contact with the indented surface of a test piece, and the resonant frequency of said member when said tip is in free condition, thereby to obtain a product proportional to the peak dynamic force applied by said tip to the test piece by reason of said vibration, and recording means operable by said product to indicate said peak dynamic force.

16. An apparatus according to claim 14; in which said resonating member is magnetostrictive and said means operative to vibrate said resonating member includes an energizing coil to effect vibration of said magnetostrictive member in response to the supplying of an alternating energizing current to said coil, power amplifier means for supplying said energizing current to the coil and having a variable gain for controlling the magnitude of said vibration, feed-back means operable in response to vibration of said resonating member to control the frequency of said energizing current for maintaining the latter at a resonant frequency of said resonating member, and means controlling the gain of said power amplifier means to maintain a selected ratio of the peak dynamic force of said tip against the test piece to the area of contact of said tip with the test piece.

17. An apparatus according to claim 14; further comprising means controlling the magnitude of said vibration of the resonating member so as to maintain a selected ratio of the peak dynamic force of said tip against the test piece to the area of contact of the tip with the test piece.

18. An apparatus according to claim 14; further comprising means to maintain constant the frequency at which said resonating member is vibrated during each interval between successive shifts of said resonant frequency thereof, and means operative when the amplitude of said vibration declines below a selected value in response to each increase of said indentation of the test piece surface by said contact tip to correspondingly increase the frequency at which said resonating member is vibrated for restoring the vibration of the latter at a resonant frequency thereof.

19. An apparatus according to claim 14; further comprising means operative to increase said static force upon each increase in the indentation of the test piece surface by said tip so as to maintain a selected ratio of said static force to the area of contact of said tip with the test piece.

References Cited

UNITED STATES PATENTS

| | | | |
|---|---|---|---|
| 2,373,351 | 4/1945 | Sims | 73—91 |
| 2,828,622 | 4/1958 | Gross et al. | 73—67.3 |
| 3,153,338 | 10/1964 | Leesattel | 73—133 |
| 3,302,454 | 2/1967 | Leesattel | 73—67.1 |

OTHER REFERENCES

Ultrasonic Vibration Causes Fatigue Cracking in Metals and Resins; V. Weiss and D. Oelschlagel; "Materials Research and Standards," April 1966 (p. 182).

Ultrasonic Hardness Testing; "Ultrasonics"; April 1966, pp. 88–91.

JAMES J. GILL, Primary Examiner

U.S. Cl. X.R.

73—91